United States Patent
Ostoja-Starzewski

(12) 
(10) Patent No.: US 6,353,064 B1
(45) Date of Patent: Mar. 5, 2002

(54) SUPPORTED CATALYSTS WITH A DONOR-ACCEPTOR INTERACTION

(75) Inventor: Karl-Heinz Aleksander Ostoja-Starzewski, Bad Vilbel (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/532,932

(22) Filed: Mar. 22, 2000

(30) Foreign Application Priority Data

Apr. 1, 1999 (DE) .......................... 199 15 108

(51) Int. Cl.⁷ .......................... C08F 4/44; C08F 210/04
(52) U.S. Cl. .................. 526/160; 526/161; 526/281; 526/335; 526/943; 526/348.6; 502/152; 502/155
(58) Field of Search ................... 526/161, 160, 526/943, 348.6, 281, 335; 502/152, 155

(56) References Cited

U.S. PATENT DOCUMENTS

| | | | |
|---|---|---|---|
| 5,324,800 A | 6/1994 | Welborn, Jr. et al. | 526/160 |
| 5,332,708 A | 7/1994 | Knudsen et al. | 502/154 |
| 5,461,126 A | 10/1995 | Knudsen et al. | 526/96 |
| 5,580,939 A | 12/1996 | Ewen et al. | 526/127 |
| 5,633,394 A | 5/1997 | Welborn, Jr. et al. | 556/11 |
| 5,747,404 A | 5/1998 | Nagy et al. | 502/104 |
| 6,156,857 A | * 12/2000 | Starzewski et al. | 526/161 |
| 6,172,169 B1 | * 1/2001 | Starzewski et al. | 526/161 |
| 6,174,974 B1 | * 1/2001 | Starzewski et al. | 526/161 |
| 6,184,320 B1 | * 2/2001 | Starzewski et al. | 526/161 |
| 6,191,241 B1 | * 2/2001 | Starzewski et al. | 526/161 |
| 6,232,413 B1 | * 5/2001 | Starzewski et al. | 526/134 |

FOREIGN PATENT DOCUMENTS

| | | |
|---|---|---|
| DE | 197 27 257 | 1/1998 |
| EP | 511665 | 4/1992 |
| EP | 683180 | 5/1995 |
| EP | 704461 | 4/1996 |
| EP | 846696 | 6/1998 |
| EP | 849288 | 6/1998 |
| EP | 658576 | 7/1998 |
| EP | 881232 | 12/1998 |
| JP | 07053621 | 2/1995 |
| JP | 07309906 | 11/1995 |
| JP | 07309907 | 11/1995 |
| JP | 08034819 | 2/1996 |
| JP | 09059310 | 3/1997 |
| JP | 09291112 | 11/1997 |
| JP | 10139807 | 5/1998 |
| JP | 10168111 | 6/1998 |
| JP | 10182737 | 7/1998 |
| WO | 94/20506 | 9/1994 |
| WO | 98/01455 | 1/1998 |
| WO | 98/01483 | 1/1998 |
| WO | 98/01484 | 1/1998 |
| WO | 98/01487 | 1/1998 |
| WO | 98/01745 | 1/1998 |
| WO | 98/30587 | 7/1998 |

OTHER PUBLICATIONS

Inst. Org. Khim. im. Zelinskogo, Moscow, URRS, Izv. Akad. Nauk SSSR, Ser. Khim (month unavailable) 1974, 8, pp. 1878–1881, N. I. Ershov et al "Products Of The Hydropolymerization Of Ethylene, Initiated By Carbon Monoxide At 190.Deg., In The Presence Of Cobalt Catalysts On Amorphous Aluminosilicates And Zeolites".

* cited by examiner

*Primary Examiner*—David W. Wu
*Assistant Examiner*—R. Harlan
(74) *Attorney, Agent, or Firm*—Joseph C. Gil; Noland J. Cheung

(57) ABSTRACT

The present invention relates to compounds in which a transition metal is complexed with two ligand systems and the two systems are reversibly connected to one another by at least one bridge consisting of a donor and an acceptor. The resultant co-ordination bond between the donor atom and the acceptor atom produces a positive (partial) charge in the donor group and a negative (partial)charge in the acceptor group:

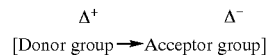

[Donor group → Acceptor group]

The invention also relates to the use of these supported catalysts with a donor-acceptor interaction as polymerization catalysts.

14 Claims, No Drawings

SUPPORTED CATALYSTS WITH A DONOR-ACCEPTOR INTERACTION

FIELD OF THE INVENTION

The present invention relates to compounds in which a transition metal is complexed with two ligand systems and the two systems are reversibly connected to one another by at least one bridge comprising a donor and an acceptor.

BACKGROUND OF THE INVENTION

The co-ordination bond formed between the donor atom and the acceptor atom produces a positive (partial) charge in the donor group and a negative (partial) charge in the acceptor group:

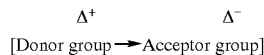

The invention also relates to the use of these supported catalysts with a donor-acceptor interaction as polymerization catalysts.

Metallocenes as π-complex compounds and their use as catalysts in the polymerization of olefins have been known for a long time (EP-A-129,368 and the literature cited therein). Furthermore, it is known from EP-A-129,368 that metallocenes in combination with aluminum alkyl/water as co-catalysts form effective systems for the polymerization of ethylene (for example, methyl aluminoxane=MAO is formed from ca. 1 mole of trimethyl aluminum and 1 mole of water. Other stoichiometric ratios have already also been successfully employed (WO 94/20506)). Also, metallocenes are already known in which cyclopentadienyl skeletons are covalently joined to one another by a bridge. As an example of the numerous patents and patent applications in this field, EP-A 704,461 may be mentioned, in which the linkage group mentioned therein is a (substituted) methylene group or ethylene group, a silylene group, a substituted silylene group, a substituted germylene group, or a substituted phosphine group. Also, in EP-A 704,461 the bridged metallocenes are provided as polymerization catalysts for olefins.

Catalysts with a donor-acceptor interaction and their use as polymerization catalysts are known in principle.

For example, WO-A-98/01455 describes compounds in which a transition metal is complexed with two π-systems, and more particularly with aromatic π-systems (metallocenes) and the two systems are reversibly connected to one another by means of a bridge comprising a donor and an acceptor, the donor and acceptor atoms being bonded as substituents to the π-systems, as well as their use as polymerization catalysts.

WO-A-98/01745 describes compounds in which a transition metal is complexed with two π-systems, and more particularly with aromatic π-systems (metallocenes), and the two systems are reversibly connected to one another by means of a bridge comprising a donor and an acceptor, at least one of the donor and/or acceptor atoms being part of the in each case respective π-system, as well as their use as polymerization catalysts.

The earlier application PCT/EP 98/08074 describes compounds in which a transition metal is complexed with a π-system and which exhibit a donor-acceptor interaction, either the donor group or the acceptor group being bonded to the transition metal, as well as their use as polymerization catalysts.

The patent applications WO-A-98/01483 to WO-A-98/01487, as well as the earlier application PCT/EP 98/08012, describe industrial polymerization processes using the described catalysts with a donor-acceptor interaction.

It is known from these documents that the catalysts with a donor-acceptor interaction can be used in supported form.

However, it was surprising to the person skilled in the art that particularly advantageous supported catalysts with a donor-acceptor interaction can be produced if special clays are used as support material.

SUMMARY OF THE INVENTION

Accordingly, the present invention provides a composition containing:

a) a transition metal compound with at least one donor-acceptor interaction b) an ion-exchanging support material with a layer lattice structure, and optionally c) one or more co-catalysts.

DETAILED DESCRIPTION OF THE INVENTION

Suitable as component a) are the transition metal compounds with a donor-acceptor interaction described in the applications WO-A-98/01455, WO-A-98/01745, WO-A-98/01483 to WO-A-98/01487, as well as the compounds described in the earlier applications PCT/EP 98/08074 and PCT/EP 98/08012.

Particularly suitable are metallocene compounds of the formulae

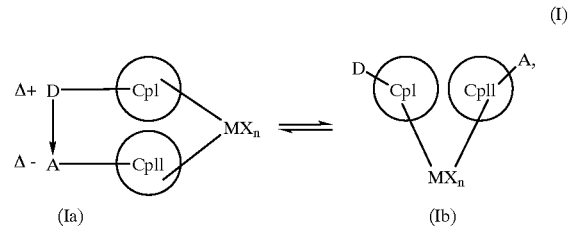

in which CpI and CpII represent two identical or different carbanions with a cyclopentadienyl-containing structure, in which one to all of the H atoms may be replaced by identical or different radicals from the group comprising linear or branched $C_1$–$C_{20}$ alkyl, which may be singly to completely substituted by halogen, singly—triply substituted by phenyl as well as singly—triply substituted by vinyl, $C_6$–$C_{12}$ aryl, halogenated aryl with 6 to 12 C atoms, organometallic substituents such as silyl, trimethylsilyl, ferrocenyl, as well as singly or doubly substituted by D and A.

D denotes a donor atom that may additionally carry substituents and that in its respective bonding state has at its disposal at least one free electron pair, A denotes an acceptor atom that may additionally carry substituents and that in its respective bonding state has an electron pair vacancy, D and A being coupled to one another by a reversible co-ordination bond in such a way that the donor group adopts a positive (partial)charge and the acceptor group adopts a negative (partial)charge, M denotes a transition metal of subgroup III, IV, V or VI of the Mendeléeff periodic system, including the lanthanides and actinides, X denotes an anion equivalent, and n denotes the number 0, 1, 2, 3 or 4 depending on the charge of M.

The first and the second carbanion CpI and CpII with a cyclopentadienyl skeleton may be the same or different. The cyclopentadienyl skeleton may for example be a skeleton from the group comprising cyclopentadiene, substituted cyclopentadiene, indene, substituted indene, fluorene and substituted fluorene. There may be 1 to 4 substituents per cyclopentadiene ring and/or fused benzene ring. These substituents may be $C_1$–$C_{20}$ alkyl such as methyl, ethyl, propyl, isopropyl, butyl or isobutyl, hexyl, octyl, decyl, dodecyl, hexadecyl, octadecyl, eicosyl, $C_1$–$C_{20}$ alkoxy such as methoxy, ethoxy, propoxy, isopropoxy, butoxy or isobutoxy, hexoxy, octyloxy, decyloxy, dodecyloxy, hexadecyloxy, octadecyloxy, eicosyloxy, halogen such as fluorine, chlorine or bromine, $C_6$–$C_{12}$ aryl such as phenyl, $C_1$–$C_4$ alkylphenyl such as tolyl, ethylphenyl, (i-)propylphenyl, (i-tert.)butylphenyl, xylyl, halogenated phenyl such as fluorophenyl, chlorophenyl or bromophenyl, naphthyl or biphenylyl, triorganyl-silyl such as trimethylsilyl (TMS), ferrocenyl as well as D or A as defined above. Furthermore, fused aromatic rings may be partially or completely hydrogenated so that only the double bond remains, which the fused ring as well as the cyclopentadiene ring both share. Furthermore, benzene rings such as in indene or fluorene may contain one or two fused further benzene rings. Also, the cyclopentadiene and/or cyclopentadienyl ring and a fused benzene ring may jointly contain a further fused benzene ring. Such cyclopentadiene skeletons, in the form of their anions, are excellent ligands for transition metals, each cyclopentadienyl carbanion of the aforementioned, optionally substituted form, compensating a positive charge of the centrally located metal in the complex. Individual examples of such carbanions include: cyclopentadienyl, methyl-cyclopentadienyl, 1,2-dimethyl-cyclopentadienyl, 1,3-dimethyl-cyclopentadienyl, indenyl, phenylindenyl, 1,2-diethyl-cyclopentadienyl, tetramethyl-cyclopentadienyl, ethyl-cyclopentadienyl, n-butyl-cyclopentadienyl, n-octyl-cyclopentadienyl, β-phenylpropyl-cyclopentadienyl, tetrahydroindenyl, propyl-cyclopentadienyl, t-butyl-cyclopentadienyl, benzyl-cyclo-pentadienyl, diphenylmethyl-cyclopentadienyl, trimethylgermyl-cyclopentadienyl, trimethylstannyl-cyclopentadienyl, trifluoromethyl-cyclopentadienyl, trimethylsilyl-cyclopentadienyl, pentamethyl-cyclopentadienyl, fluorenyl, tetrahydro-fluorenyl or octahydro-fluorenyl, fluorenyls and indenyls benzo-anellated on the 6-membered ring, N,N-dimethylamino-cyclopentadienyl, dimethylphosphino-cyclopentadienyl, methoxy-cyclopentadienyl, dimethylboranyl-cyclopentadienyl, (N,N-dimethyl-aminomethyl)-cyclopentadienyl.

The index n has the value 0, 1, 2, 3 or 4, preferably 0, 1 or 2, depending on the charge of M. The aforementioned subgroup metals may in fact, depending inter alia on which subgroup they belong to, adopt valencies/charges ranging from 2 to 6, preferably 2 to 4, two of which valencies/charges are in each case compensated by the carbanions of the metallocene compounds. In the case of $La^{3+}$, the index n accordingly adopts the value 1 and in the case of $Zr^{4+}$, adopts the value 2; in $Sm^{2+}$, n=0.

For the preparation of the compounds (I) reference may be made to WO-A-98/01455.

Also particularly suitable are metallocene compounds of the formula (II)

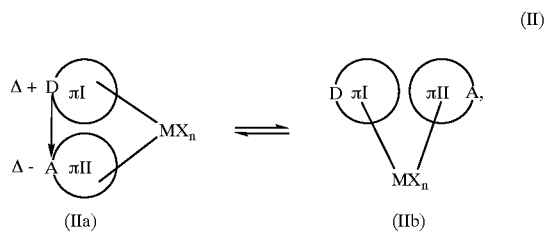

(II)

(IIa)        (IIb)

in which

πI and πII denote charged or electrically neutral π-systems that are different from one another, and which may be singly or doubly condensed with unsaturated or saturated 5-membered or 6-membered rings, D denotes a donor atom that is a substituent of πI or part of the π-system of πI and which, in its respective bonding state has at its disposal at least one free electron pair, A denotes an acceptor atom that is a substituent of πII or is part of the π-system of πII and which, in its respective bonding state has at its disposal an electron pair vacancy, wherein D and A are coupled to one another by a reversible co-ordination bond in such a way that the donor group adopts a positive (partial)charge and the acceptor group adopts a negative (partial)charge and wherein at least one of D and A is part of the in each case associated π-system, wherein D and A may in turn carry substituents,
wherein each π-system or each fused ring system may contain one or more D or A or D and A, and
wherein, in πI and πII, in the uncondensed form or in the condensed form, one to all of the H atoms of the π-system may be substituted independently of one another by the same or different radicals from the group comprising linear or branched $C_1$–$C_{20}$ alkyl that may be singly to completely substituted by halogen, singly—triply by phenyl as well as singly—triply by vinyl, $C_6$–$C_{12}$ aryl, halogenated aryl with 6 to 12 C atoms, as well as singly or doubly substituted by D and A, so that the reversible coordination D→A bond is formed (i) between D and A, both of which, are parts of the respective π-system or of the fused ring system, or (ii) of which D or A is part of the π-system or of the fused ring system and in each case, the other substituent is part of the uncondensed π-system or of the fused ring system, or (iii) D as well as A are such substituents, wherein the case of (iii), at least an additional D or A or both is (are) parts of the π-system or of the fused ring system.

M denotes a transition metal of subgroups III, IV, V or VI of the Mendeléeff periodic system, including the lanthanides and actinides, X denotes an anion equivalent, and n denotes the number 0, 1, 2, 3 or 4 depending on the charges of M as well as those of π-I and π-II.

π-systems according to the present invention are substituted and unsubstituted ethylene, allyl, pentadienyl, benzyl, butadiene, benzene, the cyclopentadienyl anion and the species resulting from the replacement of at least one C atom by a hetero atom. Among the aforementioned species, cyclic species are preferred. The nature of the co-ordination of such ligands (π-systems) to the metal may be of the σ-type or π-type.

The index n adopts the value 0, 1, 2, 3 or 4, preferably 0, 1 or 2, depending on the charge of M. The aforementioned subgroup metals may, in fact, depending inter alia on which of the subgroups they belong to, adopt valencies/charges ranging from 2 to 6, preferably 2 to 4, two of which charges are in each case compensated by the carbanions of the metallocene compound. In the case of $La^{3+}$ the index n accordingly adopts the value 1, and in the case of $Zr^{4+}$ adopts the value 2: in $Sm^{2+}$, n=0.

In the formation of the metallocene structure according to the above formula (I) or (II), each positive charge of the transition metal M is compensated by a cyclopentadienyl-containing carbanion. Positive charges still remaining on the central atom M are saturated by further, for the most part, monovalent anions X, two of which, identical or different, may also be coupled to one another (dianions),

for example, monovalent or divalent negative radicals of the same or different, linear or branched, saturated or unsaturated hydrocarbons, amines, phosphines, thioalcohols, alcohols or phenols. Simple anions such as $CR_3^-$, $NR_2^-$, $PR_2^-$, $OR^-$, $SR^-$ may be joined by saturated or unsaturated hydrocarbon or silane bridges, whereby dianions are formed and the number of bridge atoms may be 0, 1, 2, 3, 4, 5 or 6; there are preferably 0 to 4 bridge atoms, particularly preferably 1 or 2 bridge atoms. The bridge atoms may, in addition to H atoms, also carry further hydrocarbon substituents R. Examples of bridges between the simple anions are —CH$_2$—, —CH$_2$—CH$_2$—, —(CH$_2$)$_3$—, CH=CH, —(CH=CH)$_2$—, —CH=CH—CH$_2$—, CH$_2$—CH=CH-CH$_2$—, —Si(CH$_3$)$_2$—, C(CH$_3$)$_2$—. Examples of X are: hydride, chloride, methyl, ethyl, phenyl, fluoride, bromide, iodide, the n-propyl radical, the i-propyl radical, the n-butyl radical, the amyl radical, the i-amyl radical, the hexyl radical, the i-butyl radical, the heptyl radical, the octyl radical, the nonyl radical, the decyl radical, the cetyl radical, methoxy, ethoxy, propoxy, butoxy, phenoxy, dimethylamino, diethylamino, methylethylamino, di-t-butylamino, diphenylamino, diphenylphosphino, dicyclohexylphosphino, dimethylphosphino, methylidene, ethylidene, propylidene, and the ethylene glycol dianion. Examples of dianions are 1,4-diphenyl-1,3-butadienediyl, 3-methyl-1,3-pentadienediyl, 1,4-dibenzyl- 1,3-butadienediyl, 2,4-hexadienediyl, 1,3 -pentadienediyl, 1,4-ditolyl-1,3-butadienediyl, 1,4-bis(trimethylsilyl)-1,3-butadienediyl, 1,3-butadienediyl. Particularly preferred are 1,4-diphenyl-1,3-butadienediyl, 1,3-pentadienediyl, 1,4-dibenzyl-1,3-butadienediyl, 2,4-hexadienediyl, 3-methyl-1,3-pentadienediyl, 1,4-ditolyl-1,3-butadienediyl and 1,4-bis(trimethylsilyl)-1,3-butadienediyl. Further examples of dianions are those with hetero atoms, for example, of the structure:

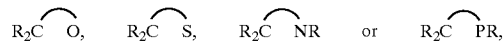

wherein the bridge has the specified meaning. Particularly preferred for the charge compensation are weakly or non-coordinating anions of the type mentioned above.

The compounds of the general formula (II) may be prepared according to WO-A-98/01745.

Also particularly suitable are π-complex compounds of transition metals of the formulae

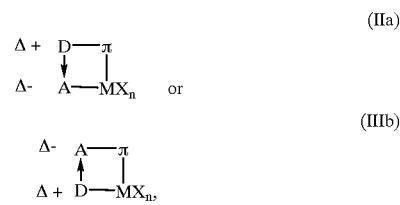

wherein
  π denotes a charged or electrically neutral π-system that may be condensed singly or doubly with unsaturated or saturated 5- or 6-membered rings and whose H atoms in the condensed or non-condensed form may be partially or completely replaced by the same or different radicals from the group comprising unbranched or branched $C_1$–$C_{20}$(cyclo)alkyl, $C_1$–$C_{20}$-halogen-(cyclo)alkyl, $C_2$–$C_{20}$-(cyclo)alkenyl, $C_1$–$C_{20}$-(cyclo)alkoxy, $C_7$–$C_{15}$-aralkyl, $C_6$–$C_{12}$-aryl or may be replaced singly or doubly by D or A.
  D denotes a donor atom, which in the case of the partial structure (IIIa), is a substituent or part of the π-system or is connected via a spacer to the π-system, and in the case of the partial structure (IIIb), is bonded to the transition metal,
  A denotes an acceptor atom, which in the case of the partial structure (IIIa) is bonded to the transition metal, and in the case of the partial structure (IIIb) is a substituent or part of the π-system or is connected via a spacer to the π-system,
wherein the bonding of D and/or A to the transition metal occurs either directly or via a spacer, wherein D and A are coupled to one another via a co-ordination bond in such a way that the donor atom adopts a positive (partial)charge and the acceptor atom adopts a negative (partial)charge, and wherein D and A may, in turn, carry substituents,
  M denotes a transition metal of subgroups III to VIII of the Mendeléeff periodic system, including the lanthanides and the actinides, preferably subgroups III to VI, including the lanthanides and Ni,
  X denotes an anion equivalent and
  n denotes the number 0, 1, 2, 3 or 4 depending on the charges of M and of π,
and wherein D and A are defined in detail as follows:
  i) within the scope of the formula (IIIa)
    D denotes doubly substituted N, P, As, Sb or Bi bonded via a spacer or directly to π, or singly or doubly substituted O, S, Se or Te, and
    A denotes B, Al, Ga or In bonded via a spacer or directly to M; or
  ii) within the scope of formula (IIIa) D and A together denote one of the groups bonded via spacers or directly to π or M

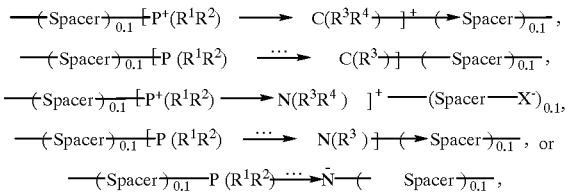

which represent phosphonium salts, phosphorylides, aminophosphonium salts and phosphinimines, or the corresponding ammonium salts and nitrogen ylides, arsonium salts and arsenylides, sulfonium salts and sulfur ylides, selenium salts and selenylides, the corresponding aminoarsonium salts and arsinimines, aminosulfonium salts and sulfimines, aminoselenium salts and selenimines,

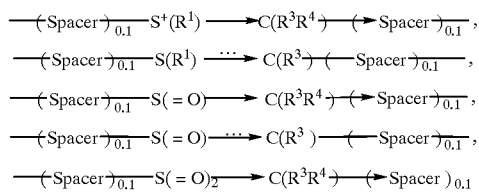

and the corresponding sulfimine structures; or iii) within the scope of formula (IIIb)

D denotes doubly substituted N, P, As, Sb or Bi bonded via a spacer or directly to M or singly or doubly substituted O, S, Se or Te, and A denotes doubly substituted Al, Ga or In bonded via a spacer or directly to π, or doubly substituted B bonded via a spacer to π;

wherein $R^1$, $R^2$, $R^3$ or $R^4$ and the term "substituted" denote, independently of one another, $C_1$–$C_{20}$-(cyclo)alkyl, $C_1$–$C_{20}$-halogen(cyclo)alkyl, $C_2$–$C_{20}$-(cyclo)alkenyl, $C_7$–$C_{15}$-aralkyl, $C_6$–$C_{12}$-aryl, $C_1$–$C_{20}$(cyclo)alkoxy, $C_7$–$C_{15}$-aralkoxy, $C_6$–$C_{12}$-aryloxy, indenyl, halogen, 1-thienyl, disubstituted amino, trisubstituted silyl which may be bonded via —CH$_2$—, or phenyl-acetylenyl, and "spacer" denotes a divalent silyl, germanyl, amino, phosphino, methylene, ethylene, propylene, disilylethylene or disiloxane group, which may be substituted 1 to 4 times by $C_1$–$C_4$-alkyl, phenyl or $C_4$–$C_6$-cycloalkyl, and the element P, N, As, S or Se is bonded via the spacer or directly to π; and wherein in the case where D is part of the π-system, a spacer is arranged between A and M, and wherein in the cases i) and ii) —C($R^1$)= also occurs as spacer.

The index n adopts the value 0, 1, 2, 3, or 4, preferably 0, 1 or 2, depending on the charge of M. The aforementioned subgroup metals may in fact, depending inter alia on what subgroups they belong to, adopt valencies/charges ranging from 2 to 6, preferably 2 to 4, two of which valencies/charges may, in each case, be compensated by the carbanions of the metallocene compound. In the case of La$^{3+}$, the index n accordingly adopts the value 1 and the in the case of Zr$^{4+}$, adopts the value 2; in the case of Sm$^{2+}$, n=0.

Important structures that fall within the scope of the formulae (IIIa) and (IIIb) are the following, which are given simply by way of example and are not meant to be exhaustive:

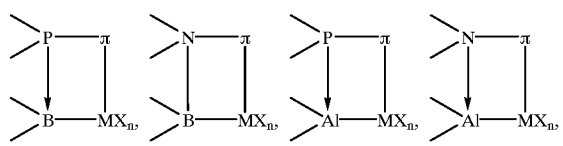

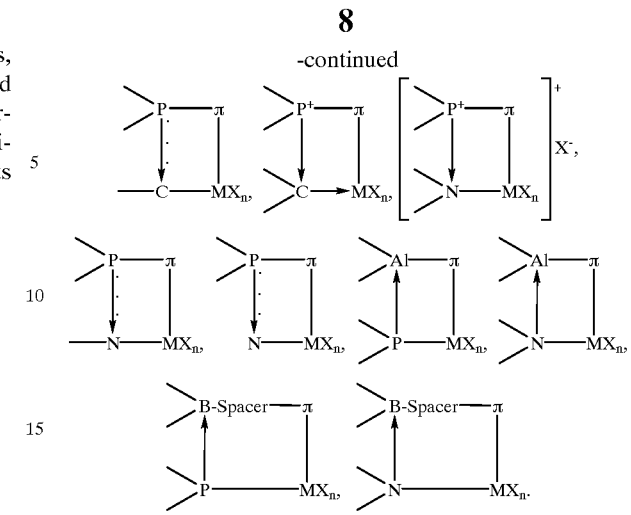

Preferred structures are those without spacers, with the exception of structures in which D is part of the π-system, which always contain a spacer between A and M. Preferred are, furthermore, structures of the partial formula (IIa). The π-complex compounds of transition metals according to the invention of the type (IIIa and IIIb) illustrated above within the scope of i) or iii) may be prepared, for example, in a manner known to those skilled in the art by reacting, in the case of the partial structure of the formula (IIIa), either one compound of each of the formulae (IV) and (V) with each other

with the loss of the compound YX(VI)

or by reacting one compound of each of the formula (VII) and (VIII) with each other

with the loss of the compound YX(VI)

or by reacting one compound of each of the formulae (IX) and (X) with each other

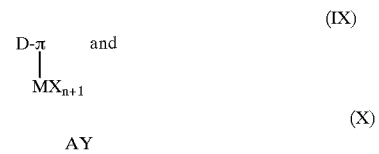

with the loss of the compound YX(VI), and in the case of the partial structure of the formula (IIIb) either by reacting one compound of each of the formulae (XI) and (XII) with each other

(XI)

and (XII)

with the loss of the compound YX(VI)
or by reacting one compound of each of the formulae (XIII) and (XIV) with each other

(XIII)

and (XIV)

with the loss of the compound YX(VI)
or by reacting one compound of each of the formulae (XV) and (XVI) with each other

(XV)

and (XVI)

with the loss of the compound YX(VI)
in the presence or in the absence of an aprotic solvent, wherein π, D, A, M, X and n have the aforementioned meanings, and Y denotes $Si(R^1R^2R^3)$, $Ge(R^1R^2R^3)$ or $Sn(R^1R^2R^3)$ wherein $R^1$, $R^2$ and $R^3$ denote, independently of one another, straight-chain or branched $C_1$–$C_{20}$-(cyclo) alkyl, $C_1$–$C_{20}$-halogen(cyclo)alkyl, $C_2$–$C_{20}$-(cyclo) alkenyl, $C_7$–$C_{15}$-aralkyl, $C_6$–$C_{12}$-aryl, vinyl, allyl or halogen, and wherein in the case where π carries a negative charge, Y may also be a cation equivalent of an (alkaline earth) alkali metal or thallium, and wherein Y may also be hydrogen if X is an amide anion of the type $R_2N^-$, a carbanion of the type $R_3C^-$ or an alcoholate anion of the type $RO^-$.

The preparation of π-complex compounds within the scope of ii) of formula (IIIa) with the contained onium salts, ylides, amino-onium salts and imines is also carried out in a manner known to those skilled in the art (A. W. Johnson, W. C. Kaska, K. A. Ostoja Starzewski, D. A. Dixon, Ylides and Imines of Phosphorus, John Wiley and Sons, Inc., New York 1993): phosphonium salts can be obtained by quaternization of phosphines with organyl halides. Dehydrohalogenation with bases at an @1:1 stoichiometric ratio yields phosphorylides. Reaction with further equivalents of base (e.g. butyl lithium) yields the ylide anion, with release of butane

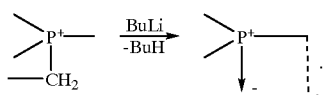

The further reaction with $MX_n$ leads with the splitting off of LiX to the D-A half-sandwich complex according to the present invention

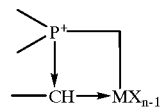

Finally, a further equivalent of base yields, under dehydrohalogenation

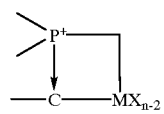

In order to prepare the isoelectronic (P→N) derivatives, one may start in a similar way from the aminophosphonium salts or from a donor-substituted half-sandwich complex such as

which, with organyl amine and carbon tetrachloride yields

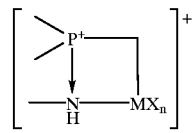

subsequent deprotonization yields in the first step

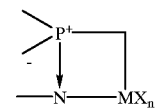

(which is also formed from the P-substituted half-sandwich complex by reaction with organyl azides or triorganylsilyl azides followed by splitting off of $N_2$) and with further base and in the case where the nitrogen carries an H atom, yields

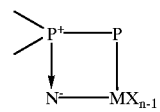

In addition to the obligatorily present first donor-acceptor bond between D and A in the formulae (I), (II), and (III), further donor-acceptor bonds may be formed if additional D and/or A are present as substituents of the respective cyclopentadiene systems. All donor-acceptor bonds are characterized by their reversibility as shown above. In the case where there is a plurality of D and/or A, these may adopt various of the aforementioned positions. Accordingly, the present invention covers the bridged molecule states as well as the unbridged states. The number of D groups may be identical or different to the number of A groups. Preferably, the ligands, in particular CpI and CpII, are coupled via only one donor-acceptor bridge.

In addition to the D/A bridges according to the present invention, covalent bridges may also be present in the formulae (I), (II) and (III). In this case, the D/A bridges strengthen the stereorigidity and the thermal stability of the catalyst. By alternating between closed and opened D/A bonds, sequence polymers with higher and lower degrees of stereoregularity may be obtained. In the case of copolymers, such sequences may have different chemical compositions.

Donor groups in the formulae (I), (II) and (III) are all those groups in which the donor atom D is an element of main group V, VI or VII of the Mendeléeff periodic system and has at least one free electron pair, and in which the donor atom, in the case of elements of main group V, is in a bonding state with substituents, and in the case of elements of main group VI may be in such a state; donor atoms of main group VII do not carry any substituents. This is illustrated as follows by the example of phosphorus P, oxygen O and chlorine Cl as donor atoms, wherein "Subst." denotes such aforementioned substituents and "—Cp" denotes the bond to the cyclopentadienyl-containing carbanion; a line with an arrow denotes a co-ordination bond as shown in formula (I) or (II), and other lines denote electron pairs that are present:

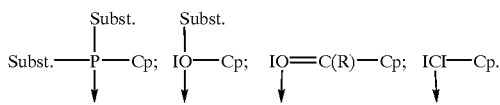

Suitable acceptor groups in the formula (I), (II) and (III) are all those groups in which the acceptor atom A is an element from main group III of the Mendeléeff periodic system, such as boron, aluminum, gallium, indium and thallium, that is in a bonding state with substituents and has an electron vacancy.

On the other hand, the acceptor atom includes elements of other main groups of the periodic system of the elements that form in their bonding state, a group selected from the groups nitrene, carbene, carbyne, acting as acceptor.

D and A are joined by a co-ordination bond, also termed a dative bond, wherein D adopts a positive (partial)charge and A adopts a negative (partial)charge.

A distinction should accordingly be drawn between the donor atom D and the donor group, and between the acceptor atom A and the acceptor group. The co-ordination bond D→A is formed between the donor atom D and the acceptor atom A. The donor group denotes the unit consisting of the donor atom D, the optionally present substituents and the present electron pairs; in a corresponding way, the acceptor group denotes the unit consisting of the acceptor atom A, the substituents, and the existing electron vacancy.

Substituents on the donor atoms N, P, As, Sb, Bi, O, S, Se and Te and on the acceptor atoms B, Al, Ga, In and Tl are for example: $C_1$–$C_{12}$(cyclo)alkyl such as methyl, ethyl, propyl, i-propyl, cyclopropyl, butyl, i-butyl, tert.-butyl, cyclobutyl, pentyl, neopentyl, cyclopentyl, hexyl, cyclohexyl, the isomeric heptyls, octyls, nonyls, decyls, undecyls, dodecyls; the corresponding $C_1$–$C_{12}$ alkoxy groups: vinyl, butenyl, allyl; $C_6$–$C_{12}$ aryl such as phenyl, naphthyl or biphenylyl, benzyl, which may be substituted by halogen, 1 or 2 $C_1$–$C_4$ alkyl groups, $C_1$–$C_4$ alkoxy groups, sulfonate, nitro or halogenated alkyl groups, $C_1$–$C_6$ alkylcarboxy, $C_1$–$C_6$ alkylcarbonyl or nitrile (for example perfluorophenyl, m,m'-bis(trifluoro-methyl)phenyl, tri($C_1$–$C_{20}$-alkyl)silyl, tri($C_6$–$C_{12}$-aryl)silyl and analogous substituents known to the person skilled in the art); analogous aryloxy groups; indenyl; halogen such F, Cl, Br and I, 1-thienyl, dissubstituted amino such as ($C_1$–$C_{12}$-alkyl)$_2$ amino, diphenylamino, tris-($C_1$–$C_{12}$-alkyl)silyl, $NaSO_3$-aryl such as $NaSO_3$-phenyl and $NaSO_3$-tolyl, $C_6H_5$—C≡C—; aliphatic and aromatic $C_1$–$C_{20}$-silyl whose alkyl substituents may in addition to the aforementioned substituents also include octyl, decyl, dodecyl, stearyl or eicosyl, and whose aryl substituents may be phenyl, tolyl, xylyl, naphthyl or biphenylyl; and such substituted silyl groups that are bonded via —$CH_2$— to the donor atom and/or to the acceptor atom, for example ($CH_3$)$_3$Si$CH_2$—, ($C_1$–$C_{12}$-alkyl)-(phenyl) amino, ($C_1$–$C_{12}$-alkylnaphthyl)amino, ($C_1$–$C_{12}$-alkylphenyl)$_2$amino, $C_6$–$C_{12}$-aryloxy with the above mentioned aryl groups, $C_1$–$C_8$-perfluoroalkyl, perfluorophenyl. Preferred substituents are: $C_1$–$C_6$-alkyl, $C_5$–$C_6$-cycloalkyl, phenyl, tolyl, $C_1$–$C_6$-alkoxy, $C_6$–$C_{12}$-aryloxy, vinyl, allyl, benzyl, perfluorophenyl, F, Cl, Br, di-($C_1$–$C_6$-alkyl)amino, diphenylamino.

Donor groups are those in which the free electron pair is localized on N, P, As, Sb, Bi, O, S, Se, Te, F, Cl, Br, I; preferred among the donor groups are N, P, O, S. The following may be mentioned as examples of donor groups:

($CH_3$)$_2$N—, ($C_2H_5$)$_2$N—, ($C_3H_7$)$_2$N—, ($C_4H_9$)$_2$N—, ($C_6H_5$)$_2$N, ($CH_3$)$_2$P—, ($C_2H_5$)$_2$P—, ($C_3H_7$)$_2$P—, (i,$C_3H_7$)$_2$P—, ($C_4H_9$)$_2$P—, (t-$C_4H_9$)P—, (cyclohexyl)$_2$P—, ($C_6H_5$)$_2$P—, ($CH_3$($C_6H_5$)P—, ($CH_3$O)$_2$P—, ($C_2H_5$O)$_2$P—, ($C_6H_5$O)$_2$P—, ($CH_3$—$C_6H_4$O)$_2$P—, (($CH_3$)$_2$N)$_2$P— methyl-containing phosphino groups, $CH_3$O—, $CH_3$S—, $C_6H_5$S—, —C($C_6H_5$)=O, —C($CH_3$)=O, —OSi($CH_3$)$_3$, —OSi($CH_3$)$_2$-t-butyl, in which N and P each carry a free electron pair and O and S each carry two free electron pairs, and wherein in the last two mentioned examples, the double-bonded oxygen is bonded via a spacer group, as well as systems such as the pyrrolidone ring, wherein the ring members different from N also act as spacers.

Acceptor groups are those in which an electron pair vacancy is present on B, Al, Ga, In or Tl, preferably B, Al or Ga; the following may be mentioned by way of example: ($CH_3$)$_2$B—, ($C_2H_5$)$_2$B—, $H_2$B—, ($C_6H_5$)$_2$B—, ($CH_3$)($C_6H_5$)B—, (vinyl)$_2$B—, (benzyl)$_2$B—, $Cl_2$B—, ($CH_3$O)$_2$B—, $Cl_2$Al—, ($CH_3$)$_2$Al—, (i-$C_4H_9$)$_2$Al—, (Cl)($C_2H_5$)Al—, ($CH_3$)$_2$Ga—, ($C_3H_7$)$_2$Ga—, (($CH_3$)$_3$Si—$CH_2$)$_2$Ga— (vinyl)$_2$Ga—, ($C_6H_5$)$_2$Ga—, ($CH_3$)$_2$In—, (($CH_3$)$_3$Si—$CH_2$)$_2$In—, (Cyclopentadienyl)$_2$In—.

Also suitable are those donor and acceptor groups that contain chiral centers or in which two substituents form a ring with the D atom or A atom.

Reference is specifically made at this point to the applications WO-A-98/01 455, WO-A-98/01 745, WO-A-98/01 483 to WO-A-98/01 487, as well as the earlier applications PCT/EP 98/08 074 and PCT/EP 98/08 012.

Suitable as component b) are all ion-exchanging support materials with a layer lattice structure known to the person skilled in the art. Ion-exchanging support materials with a layer lattice structure are materials in which the individual layers built up, for example, by ionic bonds are stacked parallel to one another, wherein weak interactions exist between the layers and possibly intercalated ions can be exchanged. These ion-exchanging support materials with a layer lattice structure may occur naturally, though they may also be produced artificially.

The layer lattices may be packed inter alia in a hexagonal close packing arrangement or also packed corresponding to the antimony, $CdCl_2$ or $CdI_2$ lattice structure. Examples of ion-exchanging support materials with a layer lattice structure are kaolin, bentonite, Kibushi clay, Gairome clay, allophane, hisingerite, pyrophyllite, talcum, vermiculite, palygorskite, kaolinite, nacrite, dickite, halloysite and montmorillonites. Montmorillonites are particularly preferred.

The surfaces of the ion-exchanging support materials with a layer lattice structure measured according to the BET method are normally in the range from 20 to 800 m$^2$/g, preferably 30 to 150 m$^2$/g, particularly preferably 40 to 100 m$^2$/g. The measurement is carried out as described by Brunauer, Emmet and Teller, J. Anorg. Chem. Soc. 60(2), 309 (1938).

Preferably, the component b) is chemically treated before use. Examples of chemical treatment that may be mentioned include surface treatment in order to remove impurities that can adversely affect the polymerization, or surface treatments in order to influence the crystal structure. In particular, there may be mentioned treatment with Bronsted acids or alkali, or treatment with salt and/or organic compounds. In this connection, the treatment with Bronsted acids may serve not only to remove impurities, but also to remove contained undesirable cations such as aluminum, iron and/or magnesium cations from the layer lattice and thereby increase the surface area. In general the crystal structure of b) is destroyed or permanently altered by the treatment with alkali. This may lead in individual cases to an increase in activity of the catalyst system.

The metal ions possibly contained between the layer lattices may be replaced by other ions, preferably sterically demanding ions. Furthermore, inorganic or also organic substances may be intercalated between the individual layers, i.e. inserted between the layers. Examples of such substances are salts such as $TiCl_4$ or $ZrCl_4$, metal alcoholates such as $Ti(OR)_4$, $Zr(OR)_4$, $PO(OR)_3$ and $B(OR)_3$, wherein the radicals R are independently selected from alkyl, aryl or aralkyl. Further examples that may be mentioned include metal hydroxide ions such as $[Al_3O_4(OH)_{24}]^{7+}$, $[Zr_4(OH)_{14}]^{2+}$ and $[Fe_3O(OCOCH_3)_6]^+$, or colloidal inorganic compounds such as $SiO_2$. These substances may obviously also be used as mixtures. As an example of other ions there may be mentioned the oxides that can be obtained from the aforementioned metal hydroxide ions by thermal elimination of water. There may, furthermore, be mentioned polymers that can be obtained by hydrolysis of metal alcoholates such as $Si(OR)_4$, $Al(OR)_3$, or $Ge(OR)_4$.

Component b) may be used without pretreatment, or after addition of water or, particularly preferably, after thermal pretreatment. The thermal pretreatment is preferably carried out in a stream of protective gas at temperatures in the range from 500° to 800° C., in particular 100° to 400° C.

Mixtures of several different components b) may obviously also be used.

Montmorillonites are most particularly preferred as component b).

The preparation of the supported catalysts according to the invention with a donor-acceptor interaction (support) is carried out in a manner known to those skilled in the art. An example is the reaction of a transition metal halide with a silylated donor ligand with the release of silyl halide to form the donor/semi-sandwich complex and further reaction of the donor/semi-sandwich complex with a silylated acceptor ligand to form the donor-acceptor metallocene with renewed release of silyl halide.

The supported catalysts according to the present invention with a donor-acceptor interaction are outstandingly suitable as catalysts in processes for the homo-polymerization and copolymerization of one or more $C_2$–$C_{40}$ olefins or for the copolymerization of one or more $C_2$–$C_{40}$ olefins with one or more $C_4$–$C_8$ iso-olefins, $C_2$–$C_8$ alkynes or $C_4$–$C_8$ diolefins in the gas, solution, bulk, high pressure or slurry phase at −60° to +250° C. at a pressure of 0.5 to 5000 bar, polymerization being able to be carried out in the presence or absence of linear and branched saturated or aromatic or alkyl-substituted aromatic $C_4$–$C_{20}$ hydrocarbons or of saturated or aromatic $C_2$–$C_{10}$ halogenated hydrocarbons. Such polymerizations may be carried out batchwise or preferably, continuously in one or more reactors. In the case where several reactors or reaction zones are employed, the polymerization may be carried out under different polymerization conditions. $10^1$ to $10^{12}$ moles of (co)monomers are reacted per mole of metallocene compounds.

The supported catalysts according to the present invention with a donor-acceptor interaction are optionally, used together with co-catalysts c). The quantitative ratio of metallocene compound to co-catalyst is then 1 to 100,000 moles of co-catalyst per mole of metallocene.

Co-catalysts are for example aluminoxane compounds. Such compounds are understood to be those of the formula

(XVII)

in which
R denotes $C_1$–$C_{20}$ alkyl, $C_6$–$C_{12}$ aryl or benzyl and
n is a number from 2 to 50, preferably 10 to 35.

It is also possible to use a mixture of different aluminoxanes or a mixture of their precursors (aluminum alkyls or alkyl aluminum halides) in combination with water (in gaseous, liquid, solid or bound form, for example as water of crystallization). The water may also be added as (residual) moisture of the polymerization medium, of the monomer, or of a support.

The bonds projecting from the square brackets of formula (XVII) contain R groups or $AlR_2$ groups as terminal groups of the oligomeric aluminoxane. Such aluminoxanes are generally present as a mixture of several aluminoxanes of different chain lengths. Detailed research has also led to aluminoxanes with a ring-type or cage structure. Aluminoxanes are commercially available compounds. In the particular case, where R=$CH_3$, the term methyl aluminoxanes (MAO) is used.

Further co-catalysts c) are voluminous, non-coordinating or weakly coordinating anions. Activation by such voluminous anions is successfully achieved, for example, by reacting the D/A metallocenes with tris-(pentafluorophenyl) borane, triphenylborane, triphenyl aluminum, trityl-tetrakis-(pentafluorophenyl) borate or N,N-dialkylphenyl-ammonium-tetrakis-(penta-fluorophenyl) borate or the corresponding phosphonium or sulfonium salts of borates or (alkaline earth) alkali metal, thallium or silver salts of borates, carbonates, tosylates, triflates, perfluorocarboxy-lates such as trifluoroacetate, or the corresponding acids. Preferably, D/A metallocenes are used whose anion equivalent X=alkyl, aryl or benzyl groups. Such derivatives may also be prepared in situ by reacting D/A metallocenes having other anion equivalents such as X=F, Cl, Br, OR, $NR_2$ etc. beforehand with aluminum alkyls, lithium organyls or Grignard compounds or zinc or lead alkyls. The reaction products obtained thereby may be activated with the aforementioned boranes or borates without prior separation.

Further co-catalysts c) include aluminum alkyls, alkyl aluminum halides, lithium alkyls or organo-magnesium compounds such as Grignard compounds or partially hydrolyzed boron organyls.

The term alkyl includes all linear or branched alkyl radicals with 1 to 12 C atoms known to those skilled in the art, such as methyl, ethyl, n-propyl, i-propyl, n-butyl, i-butyl, t-butyl, n-pentyl, i-pentyl, neo-pentyl, hexyl, heptyl, octyl and iso-octyl, the alkyl chains being able to be interrupted by one or more hetero atoms, in particular oxygen.

Examples of preferred aluminum alkyls are aluminum trialkyls such as aluminum trimethyl, aluminum triethyl, triisobutyl aluminum, triisooctyl aluminum. Examples of alkyl aluminum halides are diethyl aluminum chloride, ethyl aluminum dichloride, and ethyl aluminum sesquichloride.

Preferred co-catalysts are aluminum and lithium alkyls.

The activation with the co-catalyst c) or the formation of the voluminous non-coordinating or weakly coordinating anion may be carried out in the autoclave or in a separate reaction vessel (preforming). The activation may be carried out in the presence or absence of the monomer(s) to be polymerized. The activation may be carried out in an aliphatic or aromatic or halogenated solvent or suspending agent or also on the surface of a catalyst support material.

The co-catalysts/co-catalysts c) may be used as such in homogeneous form or also individually or jointly in heterogeneous form on supports. The support material may be of an inorganic or organic nature, such as silica gel, $Al_2O_3$, $MgCl_2$, cellulose derivatives, starch and polymers, or also the component b).

Support materials are preferably thermally and/or chemically pretreated in order to specifically adjust or maintain the water content and/or the OH group concentration as low as possible. A chemical pretreatment may for example comprise reacting the support with aluminum alkyl. Inorganic supports are usually heated to 100° C. to 1000° C. for 1 to 100 hours before use. The surface of such inorganic supports, in particular of silica ($SiO_2$), is between 10 and 1000 $m^2/g$, preferably between 100 and 800 $m^2/g$. The particle diameter is between 0.1 and 500 microns ($\mu$), preferably between 10 and 200 $\mu$.

Olefins, i-olefins, cycloolefins, alkynes and diolefins to be converted by homopolymerization or copolymerization include for example, ethylene, propylene, butene-1, i-butene, pentene-1, hexene-1, octene-1, 3-methylbutene-1, 4-methyl-pentene-1, 4-methylhexene-1, 1,3-butadiene, isoprene, 1,4-hexadiene, 1,5-hexadiene and 1,6-octadiene, methyloctadiene, vinylcyclohexane, vinylcyclohexene, chloroprene, acetylene and methylacetylene. A cyclizing polymerization may, furthermore, be carried out with α, ω-diolefins, in which, for example, poly-(methylene-1,3-cyclopentane) is formed from 1,5-hexadiene:

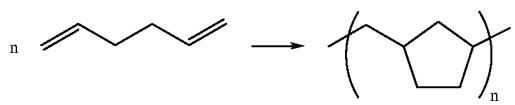

If trialkylsilyl-substituted α, ω-diolefins are used, a functional group can be introduced subsequently by a polymerization-type reaction.

The olefins and diolefins may furthermore be substituted, for example, by phenyl, substituted phenyl, halogen, an esterified carboxyl group or an acid anhydride group; compounds of this type include for example styrene, methyl styrene, chlorostyrene, fluorostyrene, indene, 4-vinylbiphenyl, vinylfluorene, vinylanthracene, methyl methacrylate, ethyl acrylate, vinylsilane, trimethylallylsilane, vinyl chloride, vinylidene chloride, tetrafluoroethylene, isobutylene, vinyl carbazole, vinyl pyrrolidone, acrylonitrile, vinyl ethers and vinyl esters.

Ring-opening polyadditions, for example, of lactones such as ε-caprolactone or δ-valerolactone, or of lactams such as ε-caprolactam, are also possible according to the present invention.

Cycloolefins that may be used are described in the applications WO-98/01483 and WO-98/01484.

Preferred monomers are: ethylene, propylene, butene, hexene, octene, 1,5-hexadiene, 1,6-octadiene, cycloolefins, methyl methacrylate, ε-caprolactone, δ-valerolactone and acetylene. It is also possible to carry out the aforementioned (co)polymerizations in the presence of hydrogen, for example, in order to adjust the molecular weight. The homopolymerizations or copolymerizations or polyadditions to be carried out with the supported catalysts with a donor-acceptor interaction according to the present invention are performed adiabatically or isothermally in the specified temperature and pressure ranges. The processes include high pressure processes in autoclaves or tubular reactors, solution polymerization as well as bulk polymerization, polymerization in the slurry phase in tubular reactors or loop reactors, as well as polymerization in the gaseous phase, in which connection the pressures for the slurry, solution and gaseous phase polymerizations do not exceed 65 bar. Such polymerizations may also be carried out in the presence of hydrogen. All these polymerization methods are well known and accessible to those skilled in the art.

The supported catalysts according to the present invention with a donor-acceptor interaction enable, through the donor-acceptor bridge, a specific opening in the manner of a beak to be made in the two cyclopentadienyl lattices or in the two ligands, thereby ensuring, in addition, to the high activity also a high stereoselectivity, a controlled molecular weight distribution and a uniform incorporation of comonomers. As a result of the specific beak-like opening, there is also space for voluminous comonomers. A high uniformity in the molecular weight distribution is furthermore achieved by the uniform and specific site of the polymerization taking place by insertion (single site catalyst).

The D/A structure may also produce an extra stabilization of the catalysts up to high temperatures, so that the catalysts can also be used in the high temperature range from 80° to 250° C., preferably 80° to 180° C. The possible thermal dissociation of the donor-acceptor bond is reversible and leads as a result of this self-organization process and self-repair mechanism to particularly desirable catalyst properties. The thermal dissociation permits, for example, a specific broadening of the molecular weight distribution, whereby the polymers can be processed more easily. This effect is manifested, for example, also in those catalysts in which the ligands, for example CpI and CpII, are each coupled by a covalent and a D/A bridge. The D/A metallocene structures according to the present invention permit, for example, a degree of defect-free polyethylene formation that cannot be achieved with conventional catalysts. The ethene polymers may correspondingly exhibit extraordinarily high melt temperatures, for example, above 135° C. to 160° C. (maximum of the DSC curve). Such linear polyethylenes, which are formed directly in the polymerization process and have melting points of 140° to 160° C. (maxima of the DSC curve), preferably 142° to 160° C., particularly preferably 144° to 160° C., are new. Such new high-melting polyethylenes exhibit, for example, improved mechanical properties and thermal deformation stability (sterilizability in medical applications) compared to the known polyethylenes, and thereby, open up new potential applications that were previously not possible for polyethylene and that, for example, could hitherto be met only by highly tactic polypropylene. Further features are high melt enthalpies and high polyethylene molecular weights.

Although the polyethylene (PE) molecular weight is reduced in a wide temperature range by raising the polymerization temperature, there is no significant reduction in activity and overall, the range of technically interesting high PE molecular weights and high PE melting points is still retained.

Furthermore, it has been observed that supported catalysts according to the present invention with a donor-acceptor interaction of suitable symmetry effect a regiospecific (isotactic, syndiotactic) polymerization on suitable monomers without, however, initiating an increasingly non-specific (atactic) coupling of the monomer units on the same monomer in the upper part of the aforementioned temperature range. This phenomenon has not yet been fully investigated, though it could be in agreement with the observation that co-ordination bonds that are overlapped by an ionic bond, such as the donor-acceptor bonds in the metallocene compounds according to the present invention, exhibit an increasing reversibility at elevated temperatures. Thus, it was observed, for example, in the ethylene-propylene copolymerization that with the same availability of both comonomers, a copolymer with a high propylene content is formed at low polymerization temperatures, whereas the propylene content decreases with increasing polymerization temperature until finally, predominantly ethylene-containing polymers are formed at high temperatures.

The reversible dissociation and association of the D/A structure and the rotation of the ligands with respect to one another that thereby becomes possible, for example of the Cp skeletons, may be represented schematically as follows:

example, is then the site of the olefin insertion for the polymerization.

The supported catalysts to be used according to the invention and having a donor-acceptor interaction are, furthermore, suitable for producing both thermoplastic and elastomeric polymers according to the various production processes mentioned above, whereby highly crystalline polymers with an optimum melting range as well as amorphous polymers with an optimum glass transition temperature can be obtained.

The polymers that can be obtained in this way are particularly suitable for producing all types of moldings, especially sheets, tubes, profiled sections, disks, optical data storage media, cable sheathings and extridates.

The following examples illustrate the invention but should not be regarded in any way as limiting the latter.

EXAMPLES

Example 1

Ethylene polymerization 1.25 g of montmorillonite (Fluka AG Buchs) with a surface of $200\pm20$ m$^2$/g, which had been dried for 2 hours at 200° C. in a stream of argon, were added through a sluice

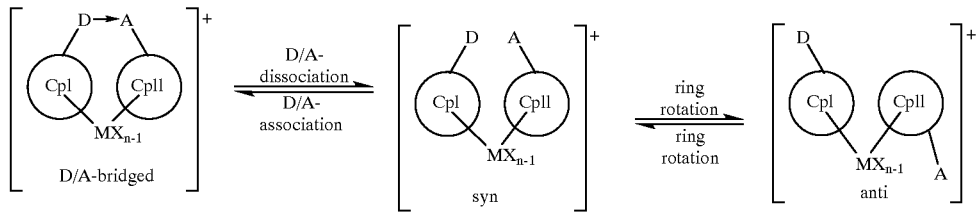

A further valuable property of the supported catalysts according to the present invention with a donor-acceptor interaction is the possibility of self-activation and thus, avoiding having to use expensive co-catalysts, especially in the case of dianionic-derivatives. The acceptor atom A in the opened form of the D/A metallocene compound binds a X-ligand, for example, one side of a dianion with the formation of a zwitterionic structure, and thereby, produces a positive charge in the transition metal, while the acceptor atom A adopts a negative charge. Such a self-activation may take place intramolecularly or intermolecularly. This is illustrated by the example of the preferred coupling of two X-ligands to a chelate ligand, namely of the butadienediyl (!!!) derivative:

system under an argon atmosphere to a heated, oxygen-free 300 ml V4A steel autoclave.

1.5 mmole of triisobutyl aluminum (TIBA) as a 1-molar solution in toluene were injected by means of a syringe and the contents of the autoclave were stirred for 1 hour at room temperature by means of a magnetic stirrer.

0.5 $\mu$mole of the D/A-metallocene [(cp)MePhPBCl$_2$(cp)ZrCl$_2$] in 2 ml of toluene was then injected and the whole mixture was stirred for a further hour. After this step, 100 ml were transferred via sodium-dried toluene to the autoclave, the autoclave was heated to 45° C., ethylene was forced in at a pressure of 10 bar, and the mixture was polymerized for 30 minutes at constant pressure. The temperature of the autoclave rose from 45° C. to 54° C. due to the exothermic

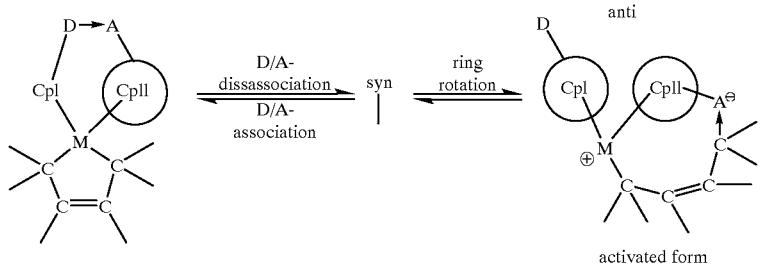

The bonding site between the transition metal M and H or substituted or unsubstituted C, for example, the still bound C of the butadienediyl dianion illustrated in the formula reaction. The autoclave pressure was released and the autoclave contents were stirred into 1 l of ethanol, following which the solids were suction filtered, washed with ethanol and dried to constant weight at 80° C. in a vacuum drying cabinet. The catalyst activity was 26.0 t PE(poly-ethylene)/mole Zr×h. In order to determine the analytical data the polyethylene was dissolved in o-dichlorobenzene under a protective gas at 120° C., the inorganic material was separated by filtration, and the polymer was precipitated in ethanol and isolated as described above. The intrinsic viscosity η in o-dichlorobenzene at 140° C. was 4.15 dl/g, corresponding to a mean molecular weight $M_v$=402 kg/mole. The DSC measurement in the second heating gave a melting point $T_m$=133° C. with a fusion enthalpy $H_m$=140 J/g.

Example 2
Propylene polymerization 1.25 g of montmorillonite with a surface of 200±20 m²/g, which had been dried for 2 hours at 200° C. in a stream of argon, were added through a sluice system under an argon atmosphere to a heated, oxygen-free 300 ml V4A steel autoclave.

1.5 mmole of triisobutyl aluminum (TIBA) as a 1-molar solution in toluene were injected by means of a syringe and stirred for 1 hour at room temperature by means of a magnetic stirrer.

0.5 μmole of the D/A-metallocene [(cp)MePhPBCl$_2$(cp)ZrCl$_2$] in 2 ml of toluene was then injected and the reaction mixture was stirred for a further hour. About 1 mole of propene was added under pressure to the autoclave, and the contents of the latter were heated to 30° C. and polymerized for 30 minutes. The internal temperature rose from 30° to 41° C. due to the exothermic reaction, the autoclave pressure was released, and the polymer formed was dissolved in toluene and separated from inorganic material by filtration. The polymerization solution dissolved in toluene was precipitated in 1 l of ethanol, washed with ethanol, and the polymer was separated by filtration and dried to constant weight at 80° C. in a vacuum drying cabinet. The catalyst activity was 17.2 t PP(polypropylene)/mole Zr×h. The intrinsic viscosity η in o-dichlorobenzene at 140° C. was 0.79 dl/g. The DSC measurement in the second heating showed a glass transition stage $T_g$ at –3° C. and a fusion enthalpy $H_m$=1 J/g.

| NMR spectroscopy: | Isotacticity index | II | 57% |
|---|---|---|---|
| | Triadene analysis | mm | 30% |
| | | mr/rm | 54% |
| | | rr | 16% |

Example 3
Ethylene-propylene-ENB terpolymerization 1.25 g of montmorillonite with a surface of 200±20 m²/g, which had been dried for 2 hours at 200° C. in a stream of argon, were added through a sluice system under an argon atmosphere to a heated, oxygen-free 300 ml V4A steel autoclave.

1.5 mmole of triisobutyl aluminum (TIBA) as a 1-molar solution in toluene were injected by means of a syringe and stirred for 1 hour at room temperature by means of a magnetic stirrer.

0.5 μmole of the D/A-metallocene [(cp)Me$_2$PBCl$_2$(cp)ZrCl$_2$] in 2 ml of toluene was then injected and stirred for a further hour. 100 ml of toluene dried over sodium and 1 g of 5-ethylidene-2-norbornene (ENB) were next transferred to the autoclave. After heating the autoclave to 45° C. 10 g of propene was forced in under pressure through a steel sluice device and the internal pressure in the autoclave was increased by 4 bar from ca. 3 to 7 bar by adding ethylene. After 30 minutes' polymerization, the autoclave pressure was released, the autoclave contents were diluted with toluene, filtered through a 50 μm filter cloth, the filtrate was precipitated in 1 l of ethanol, and the polymer was isolated by filtration, washed with ethanol, and dried to constant weight at 80° C. in a vacuum drying cabinet. The catalyst activity was 16.8 t EPDM/mole Zr×h. The intrinsic viscosity η in o-dichlorobenzene at 140° C. was 1.19 dl/g. The DSC measurement in the second heating gave a glass transition temperature $T_g$=–45° C., a glass transition temperature $T_e$=–49° C., and a fusion enthalpy $H_m$=28 J/g. The composition of the EPDM rubber as determined by IR spectroscopy was:

| Ethene | 61 weight %, |
|---|---|
| Propene | 31 weight %, |
| ENB | 8 weight %. |

Example 4
Ethylene-propylene-ENB terpolymerization

The procedure described in Example 3 was repeated, except that [(cp)Et$_2$PBCl$_2$(cp)ZrCl$_2$] was used as D/A-metallocene.

The internal temperature of the autoclave rose during the polymerization from 45° to 48° C. The catalyst activity was about 13 tons EPDM per mole Zr and per hour. The amorphous rubber had an intrinsic viscosity η in o-dichlorobenzene at 140° C. of ca. 1 dl/g. The DSC measurement in the second heating gave a glass transition temperature $T_g$=–51° C.

The composition of the EPDM rubber as determined by IR spectroscopy was:

| Ethene | 55 weight %, |
|---|---|
| Propene | 39 weight %, |
| ENB | 6 weight %. |

Example 5
Propylene polymerization

The procedure described in Example 2 was adopted, except that rac[2-Me-ind)-Et$_2$PBCl$_2$(2-Me-ind)ZrCl$_2$] was used as D/A-metallocene and the montmorillonite was dried at 200° C. for 5 hours at 6×10$^{-3}$ mbar. The autoclave contents were heated to ca. 40° C. in the presence of propylene. The polypropylene formed had an intrinsic viscosity 1 in o-dichlorobenzene at 140° C. of 2.13 dl/g. The DSC measurement in the second heating showed a glass transition at –6° C. and a melting point maximum at 151° C.

Example 6
Ethylene-propylene-ENB terpolymerization

The procedure described in Example 3 was adopted, except that 1 μmole of D/A-metallocene to 2 g of montmorillonite with 3 mmole of triisobutyl aluminum was used. The catalyst activity was ca. 12 tons EPDM per mole Zr and per hour.

η(o-dichlorobenzene, 140° C.)=1.1 dl/g Tg (DSC, second heating)=–48° C.

| IR: | Ethene | 57 weight % |
| --- | --- | --- |
| | Propene | 35 weight % |
| | ENB | 8 weight % |

Example 7 (Comparison Example)
Ethylene-propylene-ENB terpolymerization

The procedure described in Example 6 was adopted, though instead of montmorillonite silica gel (Grace Type 332) that had first of all been dried at 200° C. for 2 hours in a stream of argon was used as support material; the catalyst activity was only 0.4 ton of polymer formed per mole of Zr and per hour.

Example 8
Catalyst preparation

All reactions were carried out under strictly anaerobic conditions and using Schlenk techniques or high vacuum techniques. The solvents used were dry and saturated with argon. Chemical shifts δ are given in ppm, relative to the respective standard:

$^1$H(tetramethylsilane), $^{11}$B(boron trifluoride etherate), $^{13}$C (tetramethylsilane), $^{31}$P(85% phosphoric acid). Negative signs denote a shift to a higher field.
(Dimethylphosphino-dichloroboranyl)-bridged bis(cyclopentadienyl) zirconium dichloride [(cp)Me$_2$ PBC$_2$(cp)ZrCl$_2$ 0.1 mole of trimethylsilyl-cyclopentadiene (Fluka) was placed in a Schlenk flask and diluted with 700 ml of dry diethyl ether and cooled to −20° C. 0.1 mole of butyl lithium (2.5 molar solution in hexane) was added dropwise to this solution and the resultant suspension was stirred at room temperature for 2 hours. 0.1 mole of dimethylchlorophosphane in 50 ml of diethyl ether was then added dropwise at 0° C. and the reaction mixture was stirred overnight at room temperature, the solvent was removed under reduced pressure, and the residue was then taken up in 200 ml of hexane. After filtration, the solvent was removed under reduced pressure and the silylated donor ligand Me$_2$ P(cp) SiMe$_3$ was recondensed at a pressure of $10^{-2}$ Torr.

A solution of 0.07 mole of the silylated donor ligand in 100 ml of toluene was added dropwise over about 3 hours to a suspension cooled to 0° C. of 0.07 mole of zirconium tetrachloride into 200 ml of toluene, and the yellow suspension was stirred overnight at room temperature. The sparingly soluble yellow D-half-sandwich complex was separated by filtration, washed with toluene and dried under reduced pressure ($10^{-3}$ Torr), and then reacted with silylated acceptor ligands to form D/A metallocene. 0.01 mole of the D-half-sandwich complex was then resuspended in 200 ml of toluene, following which the silylated acceptor ligand BCl$_2$(cp)SiMe$_3$ in 40 ml of toluene was slowly added dropwise at 0° C.

After further reaction overnight at room temperature, the complex was filtered, and the filtrate was concentrated by evaporation under reduced pressure until it started to become turbid and was then crystallized in a deep cooling cabinet. The D/A metallocene was obtained in the form of fine needles for the X-ray structural analysis, by recrystallization from toluene. X-ray structure analysis of 1:

d(PB)=198.25 (13) pm
d(centroid Cp$_p$Zr)=221.5 pm
d(Zr-cp$_B$ centroid)=219.2 pm
Angle (centroid-Zr-centroid)=127.9°
Angle (Cl-Zr-Cl)=96.562(12)°

$^{31}$P{$^1$H}NMR(162 MHz, CD$_2$Cl$_2$)δ=−7.7(m)
$^{11}$B{$^1$H}NMR(128 MHz, CD$_2$Cl$_2$)δ=−0.1(d, $^1$J$^3$P$^{11}$B=120 Hz)
$^{13}$C{$^1$H}NMR(101 MHz, CD$_2$Cl$_2$)δ=+8.7(d, $^1$J$^{31}$P$^{13}$C=41 Hz, CH$_3$), +104.1 (d, $^1$J$^{31}$P$^{13}$C=66 Hz, C$_p$-α)+119.4 (s, C$_B$-β), +120.2(d, $^2$J$^{31}$P$^{13}$C=8 Hz, C$_p$-β), +123.2(d, $^3$J$^{31}$P$^{13}$C=7 Hz, C$_p$-γ), +125.7(s, C$_B$-γ).
$^1$H NMR (400 MHz, CD$_2$Cl$_2$)δ=+1.94(d,$^2$J$^{31}$P$^1$H=12.0 Hz, CH$_3$), +6.56(m, C$_{B-\beta H}$), +6.74(pseudo-q, 3 Hz, C$_p$-γH), +6.79(pseudo-t, 3 Hz, C$_B$-γH), +7.01(Pseudo-q, 3 Hz, C$_p$-βH). The attribution was made on the basis of the 2 D NMR spectra $^1$H NOESY, $^1$H$^{13}$C HMQC, $^1$H$^{13}$C HMBC.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

Example 9
Ethylene-hexene copolymerization 0.75 g of montmorillonite (KIO) with a surface area of 200±20 m$^2$/g, which had been dried for 2 hours in a stream of argon at 200° C., was introduced under an argon atmosphere into a torch-dried, oxygen-free, 300 ml V4A autoclave via a pressure sluice system.

0.75 mmole of triisobutyl aluminium (TIBA) as a 1-molar solution in toluene was injected by means of a syringe and stirred for 1 hour at room temperature by means of a magnetic stirrer.

Then 0.25 mmole of the D/A-metallocene [(cp)Et$_2$PBCl$_2$(cp)ZrCl$_2$] in 0.5 ml of toluene was injected and stirred for a further hour. Then 100 g (148.6 ml) of dry, argon-saturated 1-hexene were introduced into the autoclave and the mixture was heated to 40° C. and an ethene pressure of 10 bars was adjusted.

The internal temperature rose from 40° C. to 44° C. After polymerization for 30 minutes the autoclave was depressurized, the transparent, viscous autoclave contents were diluted with toluene and filtered and the copolymer was precipitated in 1 l of ethanol, isolated by filtration, washed with ethanol and dried to constant weight in a vacuum drying cabinet at 80° C.

Yield: 5 g Catalyst activity: 40 t of copolymer per mole Zr and per hour.

Copolymer composition (NMR):
58.4% by weight and 31.8 mole % of hexene
41.6% by weight and 68.2 mole % of ethene
Intrinsic viscosity in o-dichlorobenzene at 140° C: 1.22 dl/g
DSC (second heating): glass transition temperature T$_e$=−67° C.
glass transition temperature T$_g$=−65° C.

What is claimed is:

1. A catalyst system comprising
   a) a transition metal compound with at least one donor-acceptor interaction
   b) an ion-exchanging support material with a layer lattice structure and optionally
   c) one or more co-catalysts.

2. A catalyst system according to claim 1, wherein said ion-exchanging support material is montmorillonite or a montmorillonite-containing mixture.

3. A catalyst system according to claim 1 wherein said co-catalyst is an alumoxane.

4. A catalyst system according to claim 3, wherein said alumoxane is methyl alumoxane (MAO).

5. A catalyst system according to claim 1, wherein said co-catalyst is an aluminum alkyl or a lithium alkyl.

6. A catalyst system according to claim 5, wherein said aluminum alkyl is selected from the group consisting of trimethyl aluminum, triethyl aluminum, tri(n-propyl) aluminum, dibutyl aluminum hydride, triisobutyl aluminum, tri(n-butyl) aluminum, tri(n-hexyl) aluminum, tri(n-octyl) aluminum or triisooctyl aluminum.

7. A process for the polymerization of α-olefins, i-olefins, cycloolefins, alkenes and/or diolefins comprising the interaction of a monomer with a catalyst system comprising a) a transition metal compound with at least one donor-acceptor interaction b) an ion-exchanging support material with a layer lattice structure and optionally c) one or more co-catalysts.

8. A process according to claim 7, wherein said ion-exchanging support material is montmorillonite or a montmorillonite-containing mixture.

9. A process according to claim 7, wherein said co-catalyst is an alumoxane.

10. A process according to claim 9, wherein said alumoxane is methyl alumoxane (MAO).

11. A process according to claim 7, wherein said co-catalyst is an aluminum alkyl or a lithium alkyl.

12. A process according to claim 11, wherein said aluminum alkyl is selected from the group consisting of trimethyl aluminum, triethyl aluminum, tri(n-propyl) aluminum, dibutyl aluminum hydride, triisobutyl aluminum, tri(n-butyl) aluminum, tri(n-hexyl) aluminum, tri(n-octyl) aluminum or triisooctyl aluminum.

13. A polymer produced by a polymerization process comprising the reaction of a monomer with a catalyst system comprising a) a transition metal compound with at least one donor-acceptor interaction b) an ion-exchanging support material with a layer lattice structure and optionally c) one or more co-catalysts.

14. A molding comprising a polymer produced by a polymerization process comprising the reaction of a monomer with a catalyst system comprising a) a transition metal compound with at least one donor-acceptor interaction b) an ion-exchanging support material with a layer lattice structure and optionally c) one or more co-catalysts.

* * * * *